United States Patent
Richins

[15] 3,672,305
[45] June 27, 1972

[54] GUIDE MEANS FOR A TRAVERSING VEHICLE

[72] Inventor: Kenneth A. Richins, Salt Lake City, Utah
[73] Assignee: Eaton Corporation, Cleveland, Ohio
[22] Filed: May 11, 1970
[21] Appl. No.: 36,308

[52] U.S. Cl............................104/23 FS, 104/134, 104/130
[51] Int. Cl.................................................B61b 13/08
[58] Field of Search..............................104/23 FS, 130, 134

[56] References Cited

UNITED STATES PATENTS

| | | |
|---|---|---|
| 3,498,234 | 3/1970 | Roumejon ............................104/134 |
| 3,276,392 | 10/1966 | Cockerell ............................104/23 FS |
| 3,225,704 | 12/1965 | Gilvar ...................................104/130 |
| 3,451,351 | 6/1969 | Hawes ..................................104/130 |
| 936,395 | 10/1909 | Worthington..........................104/134 |
| 3,167,145 | 1/1965 | Mackie................................104/23 FS |
| 3,580,181 | 5/1971 | Bertin....................................104/134 |

Primary Examiner—James B. Marbert
Assistant Examiner—D. W. Keen
Attorney—Teagno and Toddy

[57] ABSTRACT

An air supported vehicle is guided by trackways at one or both sides thereof, in which the trackways contact guide rollers mounted on the vehicle. The rollers contact the trackway to prevent lateral movement while permitting variations in the vertical positioning of the vehicle by the air. Additional rollers on the vehicle may limit its vertical movement or lock it in a fixed vertical position relatively to the trackways. The vehicle may be moved away from the side trackways for guidance by other trackways and additional guides on the vehicle. The upper end of the vehicle is guided by upper trackways that are formed to permit ready movement of the vehicle in an aisle, from one aisle to another and vertical movement of the vehicle within predetermined limits while preventing movement laterally of the vehicle during movement in an aisle.

9 Claims, 5 Drawing Figures

INVENTOR.
KENNETH A. RICHINS
BY: Teagno & Toddy
ATTORNEY.

INVENTOR.
KENNETH A. RICHINS
BY Teagno & Toddy
ATTORNEY.

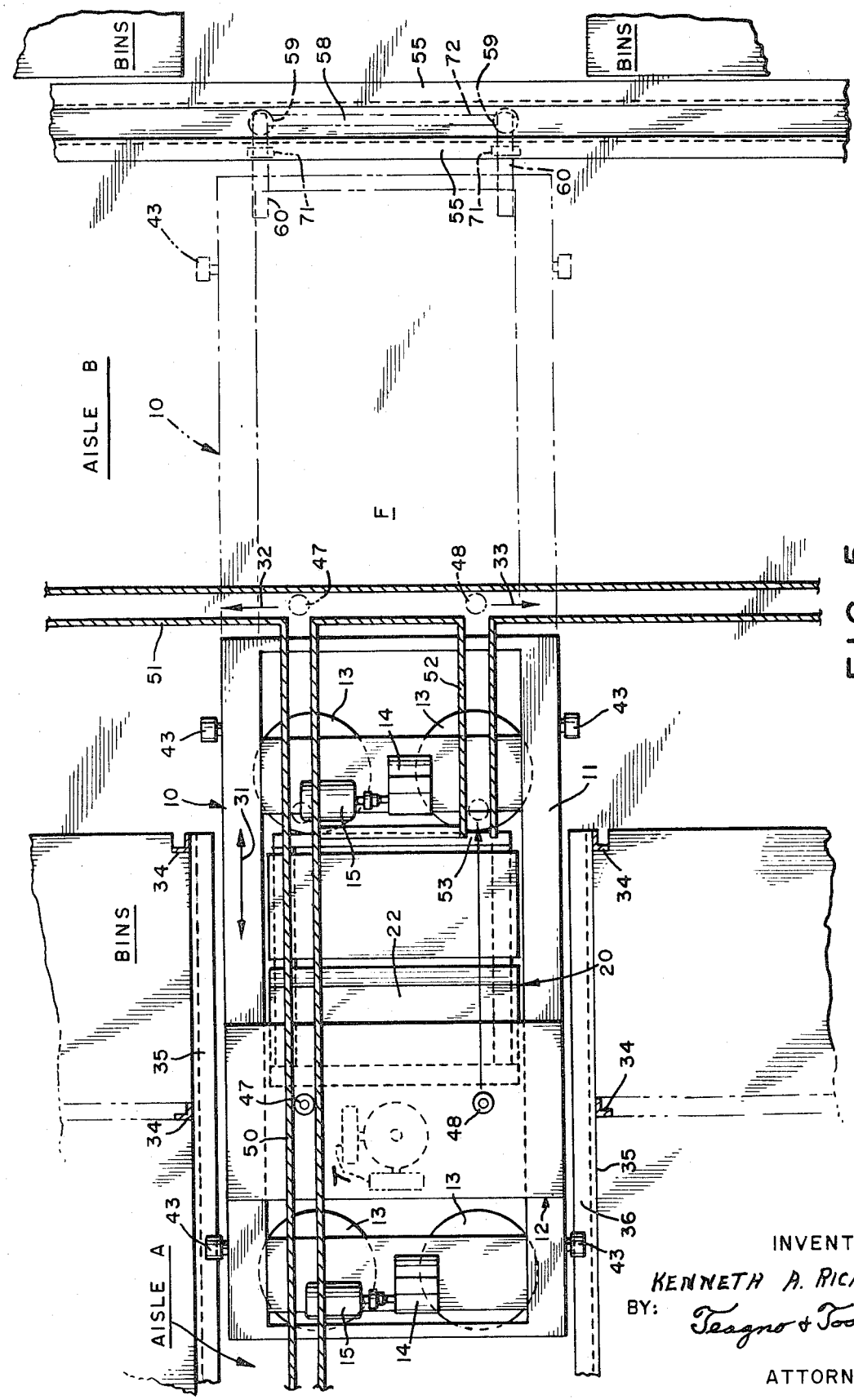

GUIDE MEANS FOR A TRAVERSING VEHICLE

BACKGROUND OF INVENTION

This invention relates to a traversing vehicle, and more particularly to a traversing vehicle of the type that is movable in a warehouse for transporting loads, and for stacking loads in bins or on shelves and the like. The invention relates more particularly to a traversing vehicle having means for moving a load to a relatively high position in a warehouse particularly constructed for the purpose, and therefore requiring means for stabilizing both the upper end and the lower end of the vehicle. Even more particularly, the invention relates to a traversing vehicle of the type adapted to be lifted slightly from a floor through the use of air flow, thus making possible the traversing movement of the vehicle thereafter by a low powered traction mechanism.

A traversing vehicle of the type disclosed in this application is well set forth in earlier applications Ser. No. 886,884, filed Dec. 22, 1969; Ser. No. 19,851, now U.S. Pat. No. 3,631,940; and Ser. No. 25,908, filed Apr. 6, 1970. recently sent to the Patent Office assigned to the assignee of this application.

PRIOR ART

Naturally there have been earlier contributions to the art including the constructions of the earlier applications set forth. Thus, the said applications disclose constructions of the particular class to which the invention relates, in which means are provided for guiding a vehicle at its lower end, and also at its upper end, for movement in linear paths, and for particularly guiding a vehicle and supporting it as it moves from one aisle into a second aisle angularly related to the first aisle. It is not believed, however, that the art discloses the novel and effective guiding mechanism and locking mechanism, and the means for transferring a vehicle from one aisle to another and facilitating its transfer, outlined and disclosed herein.

OUTLINE OF THE INVENTION

A feature of this invention resides in applying to a vehicle, side guides for coaction with a particular type of trackway, together with novel floor guides adapted for utilization with a surface or subterranean trackway, as well as top guides and transfer means for the top guides. This concept, as will be set forth particularly hereinafter, makes possible the effective guiding of a vehicle in one aisle, and then the transfer of the vehicle to a second aisle in which there are no obstructing guide mechanisms. In turn, this makes possible the utilization of standard wheeled vehicles in the second aisle. Therefore, a warehouse may, through the invention, be utilized to its greatest extent, since both air supported special vehicles, as well as standard vehicles, may be employed for manipulating loads and for transferring loads from one aisle to another and from one vehicle to another.

As a particular feature of the invention, the vehicle may be equipped with side guiding mechanisms adapted to guide and stabilize the vehicle, and also to lock the vehicle in a particular elevated position or a particular lowered position. Those skilled in the art will appreciate that through this concept, an air supported vehicle may be effectively guided despite variations in its vertical position that occur as it moves. At the same time, the vehicle may be held in a fixed vertical position, while still guided, so it may accurately spot a load.

As a more particular feature of this portion of the invention, all or part of the guide mechanism on the vehicle may be withdrawn from guide position, or from a position locking the vehicle in an elevated or lowered position.

A further feature of the invention resides in a novel type of guide mechanism on the vehicle adapted for coaction with a surface of subterranean trackway. The trackway, as earlier indicated, makes possible the use of a conventional vehicle for traversing the aisle in which the trackway is positioned. The guide means on the vehicle for coacting with the trackway may be maintained in a position within the vehicle, and out of coaction with the trackway, or may be moved for coaction with the trackway, and to be held against the trackway yieldingly as by a pneumatic cylinder. Through the utilization of suitable limit mechanism, the guide means will be held effectively in a position coacting with the surface or subterranean trackway in all elevated positions of the vehicle. This naturally is important in an air supported vehicle of the class to which this invention is particularly applied.

A still further feature of the invention resides in the utilization of novel trolleys coacting with linear trackways, preferably fixed adjacent the ceiling of the warehouse in which the vehicle operates, the trolleys being movable vertically relatively to the trackways, and being adapted for ready transfer from one trackway to another.

DESCRIPTION OF THE DRAWINGS

In the drawings,

FIG. 5 is a plan view and partial section along line 5—5 of FIG. 1.

DESCRIPTION OF THE INVENTION

Figure 1:
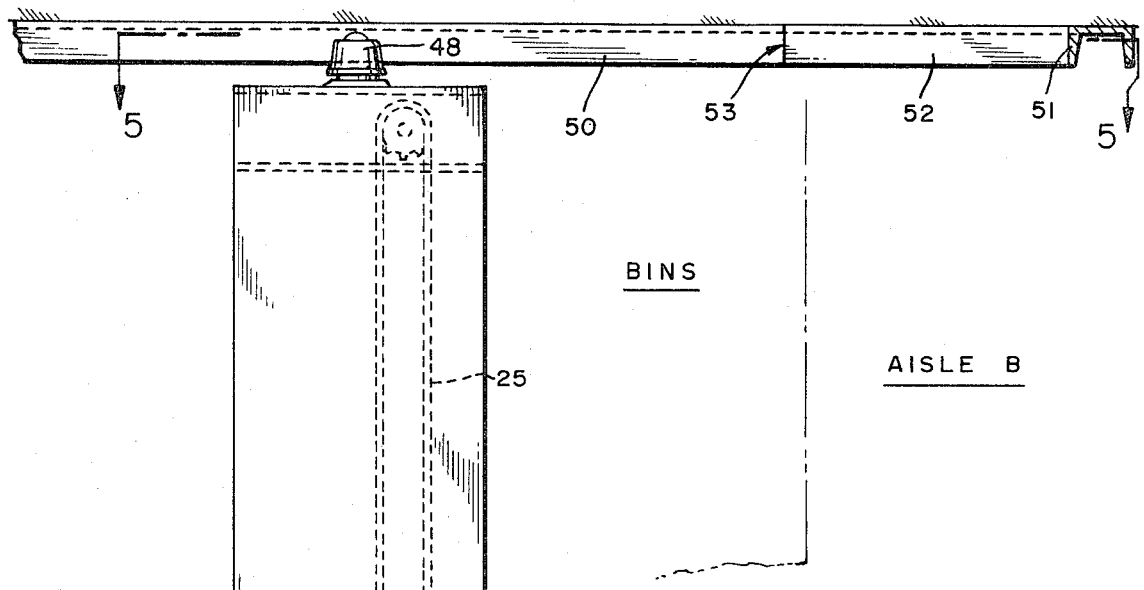
FIG. 1 is a vertical side view of the vehicle of this invention, showing its coaction with guides in conformance with the concept of the invention.
Figure 1:
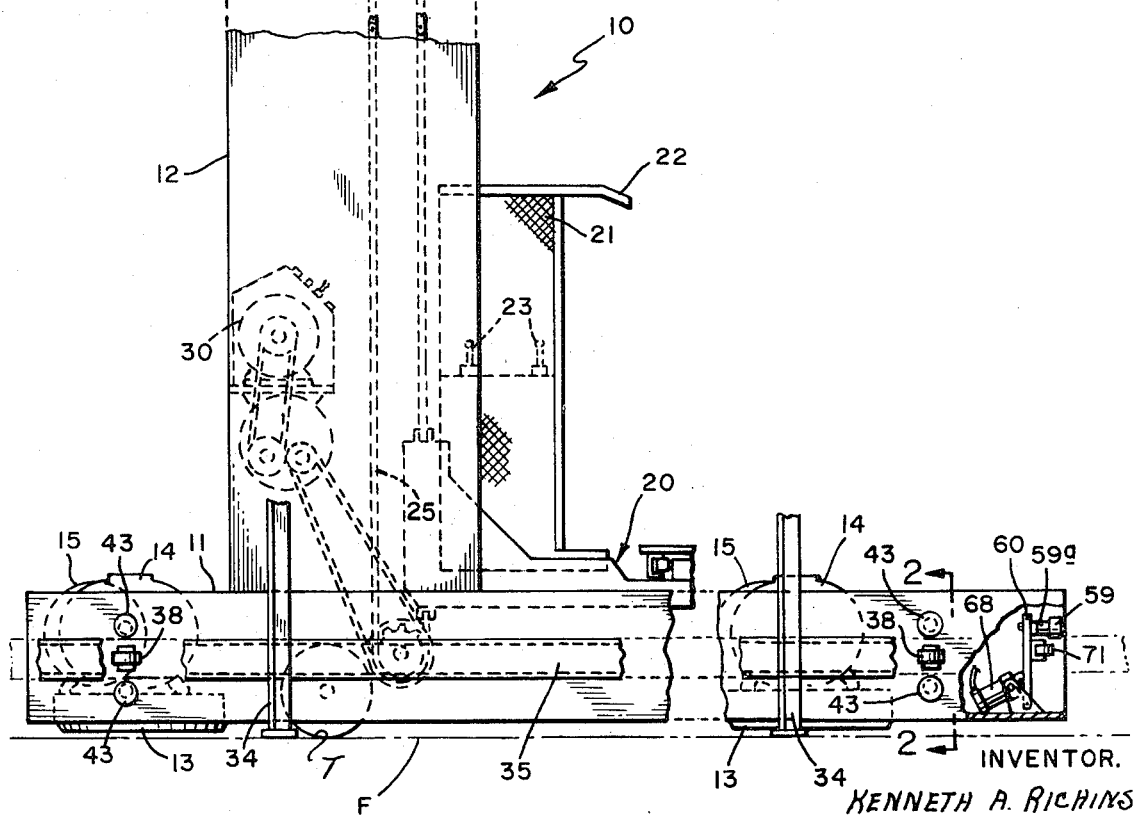

The vehicle of this invention is designated generally by reference numeral 10, and comprises a lower main frame 11 from which extends a vertical mast 12. A series of air support pads 13, best illustrated in FIGS. 1 and 5, are secured to the bottom of the vehicle main frame 11. Suitable blowers 14 driven by motors 15 generate air pressure which through the pads 13 supports the vehicle in a raised position relatively to the floor F as well seen in FIGS. 1 and 4.

Supported for vertical movement on the mast 12 is a load elevating platform 20, on which is adapted to stand an operator, protected by a screen 21 and a canopy 22. Through suitable controls 23, the operator may control the manipulation of the vehicle and the movement upwardly and downwardly of the load platform 20 relatively to the mast 12. A conventional chain mechanism 25, suitably actuated by a series of sprockets driven by an electric motor 30, will effect the upward and downward movement of the platform 20 as is standard in the art. Thus, the general construction of the vehicle, the load manipulating and lifting mechanism, and the air support means and their actuation, are all features that are not per se part of the invention of this application, and for that reason will not be set forth in any greater detail than just presented. A more complete understanding of the operation of the vehicle may be obtained by reference to the applications referred to above.

Figure 2:
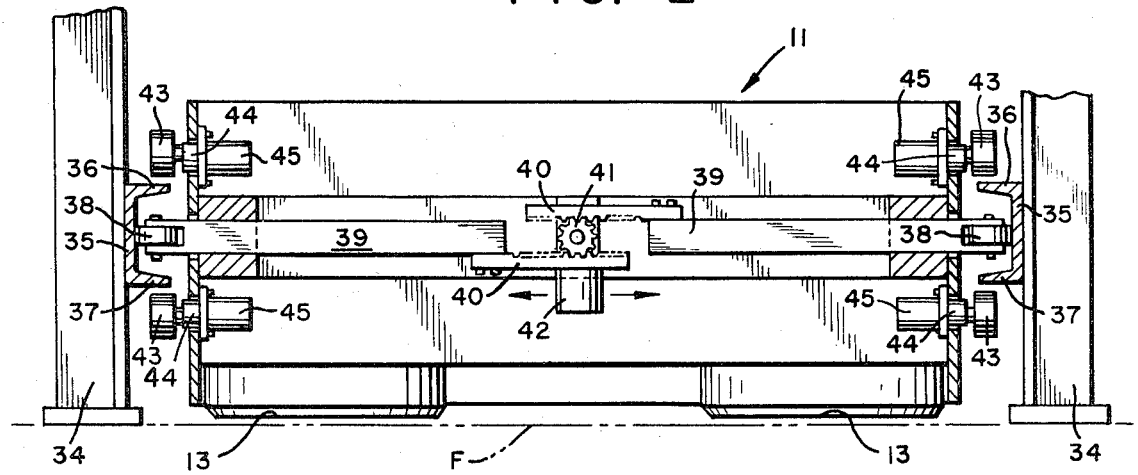
FIG. 2 is a sectional view taken substantially along line 2—2 of FIG. 1 illustrating the coaction of the guides of the vehicle with a trackway at the side of the vehicle.

As can best be seen in FIG. 5, the vehicle 10 is adapted to move in an aisle A in opposed directions as indicated by the double arrow 31. It is also adapted to move transversely in an aisle B as indicated by arrows 32 and 33. For guiding the vehicle in the aisle A, a series of stanchions 34 support at each side of aisle A, a trackway 35 whose shape is best illustrated in FIG. 2. Each trackway 35 is substantially a U-shaped beam having an upper flange 36 and a lower flange 37. Adapted to ride between the flanges of each beam 35 is a roller 38 secured on a shaft 39, each shaft 39 having fixed thereto a rack portion 40. The two rack portions 40 are adapted to be reciprocated by a gear 41 that is actuated by a pneumatic motor 42 of any standard form.

It is the function of the pneumatic motor 42, through the gear 41 and the racks 40 to press the rods 39 and their rollers 38 yieldingly against the two beams 35. Alternately, the motor 42 may retract the two rollers 38 from beams 35 to an inward position relatively to main frame 11, and out of obstructing position. As best illustrated in FIG. 2, when the vehicle is slightly raised off the floor F by the several air pads 13, the two rollers 38 will be midway approximately between the two flanges 36 and 37 of the beam 35. Obviously, the distance between the flanges may be set in accordance with the preferred movement of the vehicle relatively to the floor F as those skilled in the art will appreciate, but it is obvious the vehicle will be effectively guided even though it moves vertically as it traverses a fixed linear path.

For controlling the movement of the vehicle relatively to the beam 35 in a vertical direction, the main frame 11 is equipped with a series of rollers 43, each of which is eccentrically mounted at 44 relatively to the main frame, for rotation on its eccentric mounting by a suitable air actuated motor 45. An air actuated motor 45 is preferred because of the presence of the powerful air flow developing means 14 used for for supplying air to the several pads 13. However, other means may be utilized for rotating the rollers 43 about their eccentric mountings 44.

In any event, it is obvious that the rollers 43, when rotated on their eccentric mountings, may be moved toward and away from the two flanges 36 and 37 of each beam 35. The purpose of the particular mechanism is to lock the vehicle in any elevated position desired, in order to align the load handling mechanism of the platform 20 in a particular position relatively to a bin or the like. Thus, while the vehicle is air supported for movement by relatively low powered traction mechanism, it may be stabilized and locked in any particular vertical position, whereby to align the load handling mechanism accurately relatively to storage means. This feature is of extreme importance because bins in modern warehouses are maintained in as close proximity as is possible in order to save space, and loads must be handled and spotted with great accuracy for safety and for ready storage and removal, all as those skilled in the art will well appreciate.

While not particularly shown, it will be understood that the motors 45 and the rollers 43 together with their mounting mechanism may be adapted for movement together with the rods 39 and the rollers 38, should such operation be desired.

It will now be appreciated that the main frame 11 is very well guided in the aisle A by the beams 35, and is well adapted for stabilized movement therefore in the aisle A. For guiding the upper end of the vehicle, trolleys 47 and 48 are utilized. These trolleys are rotatably mounted on the mast 12 for movement therewith. In the position of the vehicle shown in full lines in FIG. 5, the trolley 47 is the only trolley that is utilized for stabilizing the upper end of the vehicle. Thus, the trolley 47 coacts with a trackway 50 that is in the shape of an inverted U. This trackway is parallel to the beams 35 and obviously coacts with the trolley 47 to hold the upper end of the vehicle well in alignment with the two beams 35.

As is also well seen in FIG. 5, the trackway 50 extends to a second trackway 51 at right angles thereto and aligned with aisle B. In aisle A there is a short third trackway 52, that is parallel to the trackway 50, and has an open end at 53. The trackway 52 extends into the trackway 51 in the same manner as does the trackway 50. When the vehicle moves from its full line position of FIG. 5 to its dotted line position, the trolley 47 will move into the trackway 51 as well shown in dotted lines in FIG. 5, and at the same time, the trolley 48 will also move into the trackway 51 as is also shown in dotted lines in FIG. 5. Therefore, both trolleys 47 and 48 will coact with the trackway 51 so that the upper end of the vehicle will be well controlled by two trolleys in its movement in the aisle B. The use of two trolleys in the aisle B is important, because the vehicle while moving in aisle B, will not be supported at its lower sides as in aisle A. Thus, in aisle A the vehicle is supported at both lower sides through the two beams 35 and by the single trolley 47 at its upper end. In aisle B, the vehicle is supported at its upper end by the two trolleys 47 and 48, and is guided at its lower end by a surface or subterranean trackway forming part of a novel form of guide mechanism, all as will now be set forth.

Figure 3:
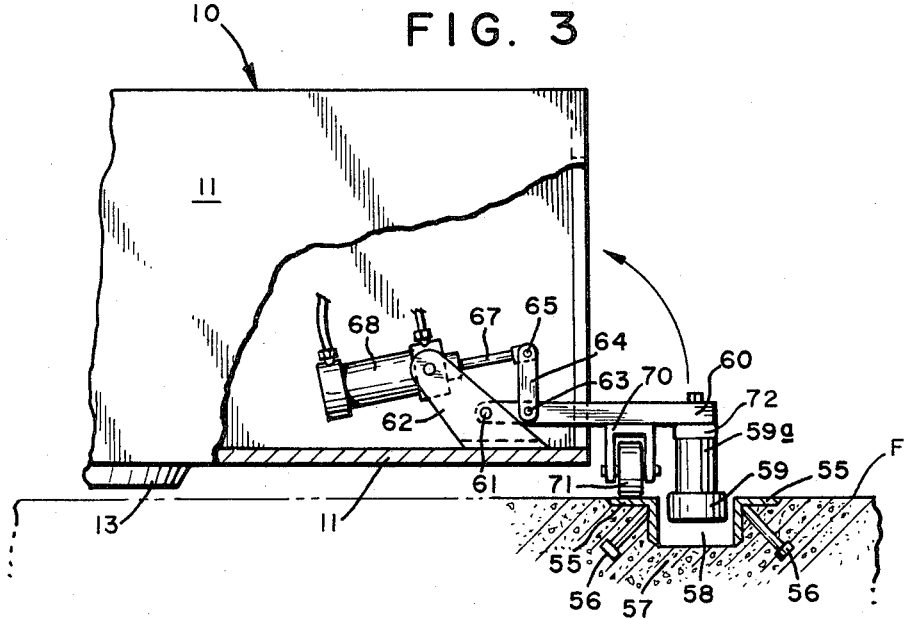
FIG. 3 is an enlarged view of a small portion of FIG. 1, illustrating a floor trackway and the movement of the guide mechanism of the vehicle into coaction with the floor trackway.

A subterranean trackway may be used and formed as best illustrated in FIG. 3. There, it will be seen that a pair of angle irons 55 are suitable secured by spikes or the like 56, in concrete 57, to form a trackway designated generally by the reference numeral 58. Shown in FIG. 3 lying in this trackway, is a roller 59 that is supported for rotation on a shaft 59a that is secured to an arm 60. The arm 60 is pivoted at 61 to a bracket 62 that is integral with the frame 11 of the truck 10. Pivoted to the arm 60 at 63 is a link 64 that is pivoted at 65 to the piston 67 of a pneumatically actuated cylinder 68. The cylinder 68 is adapted to receive its air pressure from the source of air pressure adapted to supply the several air support pads 13.

For limiting the movement of the roller 59 with the arm 60, there is secured to the arm 60 a bracket 70 on which is supported for rotation a limiting roller 71. It is obvious in FIG. 3, that the roller 71 coacts with a surface of one of the angle irons 55 of the trackway for limiting the movement of the guide roller 59 inwardly of the trackway 58. It is further obvious, that should the vehicle rise from its position of FIG. 3 because of the supply of additional air pressure to the air pads 13, the limiting roller 71 will allow the arm 60 to move the roller 59 further toward the trackway 58 so as to maintain the roller 59 at all times in its proper relation to the trackway 58.

Figure 4:
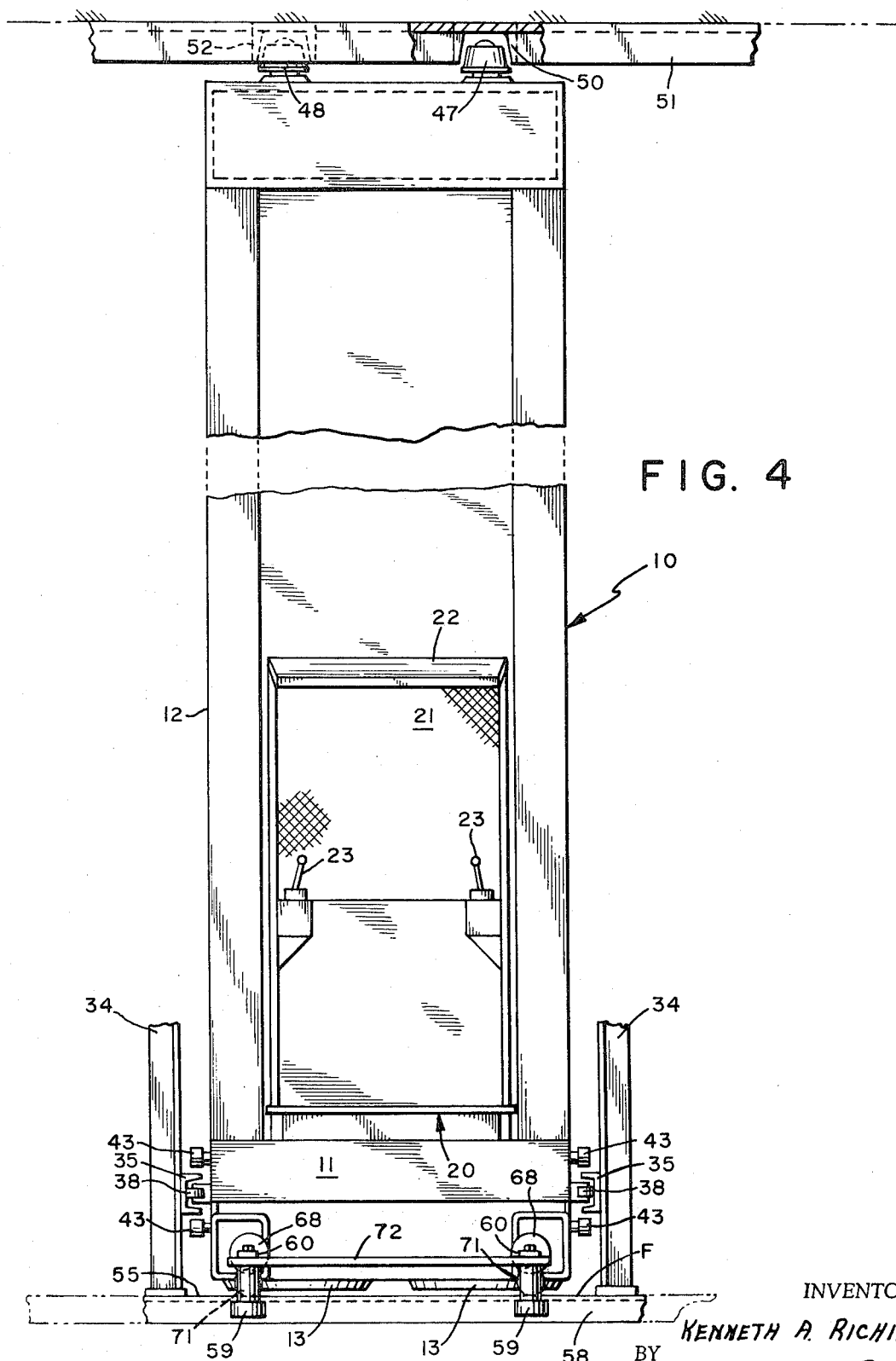
FIG. 4 is an end view of the vehicle of FIG. 1 and the guide mechanism coacting therewith, but illustrating the floor guide rollers in the position shown in FIG. 3.

Actually, there are two rollers 59 as can best be seen in FIG. 4, one roller at each side of the vehicle 10. These rollers together with the operating means therefore just described, are normally maintained preferably within the vehicle as best illustrated in FIG. 1, where a part of the frame portion 11 of the vehicle has been cut away to show the parts. Thus, there will be two rollers 59 and two rollers 71, together with two cylinders 68. There is an interconnection between the parts 60 by means of a transverse rod 72 as also best seen in FIG. 4, to insure the movement of the two rollers 59 together into the trackway 58.

It will now be apparent that the vehicle is well guided for movement in the aisle A by the rollers 38, and that its vertical position in the aisle A is well controlled also by the several control rollers 43. The stabilizing of the vehicle by the rollers 43 is, as earlier outlined, extremely important because of the location of the storage bins within the aisle A. The single trolley 47 is adequate for stabilizing the vehicle in aisle A, because of the utilization of the stabilizing means at each side of the vehicle. As is also apparent, the vehicle is well stabilized within the aisle B by the utilization of two trolleys 47 and 48, and is adequately guided at its lower end by the pair of guide rollers 59. Because the vehicle is not adapted to store goods in bins in aisle B as in aisle A, no additional vertical stabilizing and locking means such as required in aisle A are found. It will be appreciated further that when the vehicle 10 is not in the aisle B, the aisle B is free for utilization by standard vehicles because of the surface or subterranean trackway.

Because the vehicle is held off the floor by pneumatic means when in either of the two aisles A and B, it is easily moved linearly in the aisles by a low powered traction wheel T that is mounted and functions as set forth in the earlier applications referred to supra, and therefore not described here. It will also be well to note, as best seen in FIG. 4, that trolleys 47, 48 are formed to coact with trackways 50 51, 52 in all the vertical positions of the vehicle to which it may be moved.

The extreme utility and effectiveness of the rollers 59 for guiding the lower end of the vehicle in the aisle B, while adapted for withdrawal so as not to interfere with the functioning of the vehicle in aisle A, is obvious. It is thought that the extremely valuable concept and contribution of this invention will now be fully understood.

I now claim:

1. In a combination of the class described, a traversing vehicle, means for guiding said vehicle for traversing a predetermined linear path comprising guide means positioned at the side of said path and guide devices mounted on the side of said vehicle engaging said guide means and coacting therewith, said guide means and guide devices being so related to said path and vehicle that said vehicle is free to move vertically in said path while maintaining engagement between said guide means and devices to thereby guide movement of said vehicle along said path, and selectively actuatable means for fixing said vehicle in a predetermined position against vertical movement relative to said path, said last stated means comprising at least one selectively actuatable motor mounted on said vehicle having a shaft mounted for rotary movement relative thereto upon actuation thereof and a lock member eccentrically mounted on said shaft positioned to engage said guide means upon rotary movement of said shaft for locking said vehicle in a predetermined vertical position relative to said guide means.

2. In the combination of claim 1, the feature that said guide means and said guide devices respectively comprise linear barriers and rollers positioned for coaction with said barriers.

3. In the combination of claim 2, the feature that said barriers define therebetween a space permitting vertical movement of said rollers between said barriers for vertical adjustment of said vehicle.

4. In the combination of claim 2, the feature that means are utilized for moving said rollers relatively to said barriers to withdraw the rollers from guiding engagement with said barriers.

5. In the combination of claim 1, the feature that air flow means are provided on said vehicle to move it vertically off a ground surface as permitted by said guide means and devices for easy transport, and traction means are provided for said vehicle to move it in said linear path.

6. In the combination of claim 1, the feature that said vehicle has a pair of spaced trolleys at its upper end adjacent the ceiling of a warehouse or the like in which said vehicle moves, and at least one trackway on said ceiling for coaction with said trolleys to stabilize said vehicle.

7. In a combination of claim 6, the feature that said trolleys and trackway are formed to allow vertical movement therebetween while remaining in engagement.

8. In a combination of the class described, a traversing vehicle, means for guiding said vehicle for traversing a predetermined path comprising guide means positioned at one side of said path and guide devices mounted on said vehicle for coacting with said guide means to guide said vehicle along said path,
   said path comprising a first aisle extending in one direction and a second aisle extending generally perpendicular thereto, said guide means comprising a first guide extending along said first aisle and a second guide extending along said second aisle,
   said guide devices comprising a first roller for engaging said first guide when said vehicle is disposed in said first aisle, a second roller for engaging said second guide when said vehicle is disposed in said second aisle, and means mounted on the vehicle for selectively moving said rollers to engage the respective guides, said guide devices being cooperable between said vehicle and said guide means to allow relative vertical movement between said vehicle and said path while effectively guiding said vehicle therealong, and
   means for locating and locking said vehicle in a predetermined vertical position relative to at least one of said guides, said means comprising a motor mounted on said vehicle, said motor having a shaft mounted therein for rotary movement relative thereto and a lock member eccentrically mounted on said shaft positioned to engage one of said guides upon rotary movement of said shaft to thereby locate and hold said vehicle in a predetermined vertical position relative to said one of said guides.

9. In the combination of claim 8, the feature that said vehicle has a trolley at its upper end coacting with a fixed trackway in said aisles for guiding and stabilizing the upper end of said vehicle, as it traverses either of said aisles.

* * * * *